United States Patent Office.

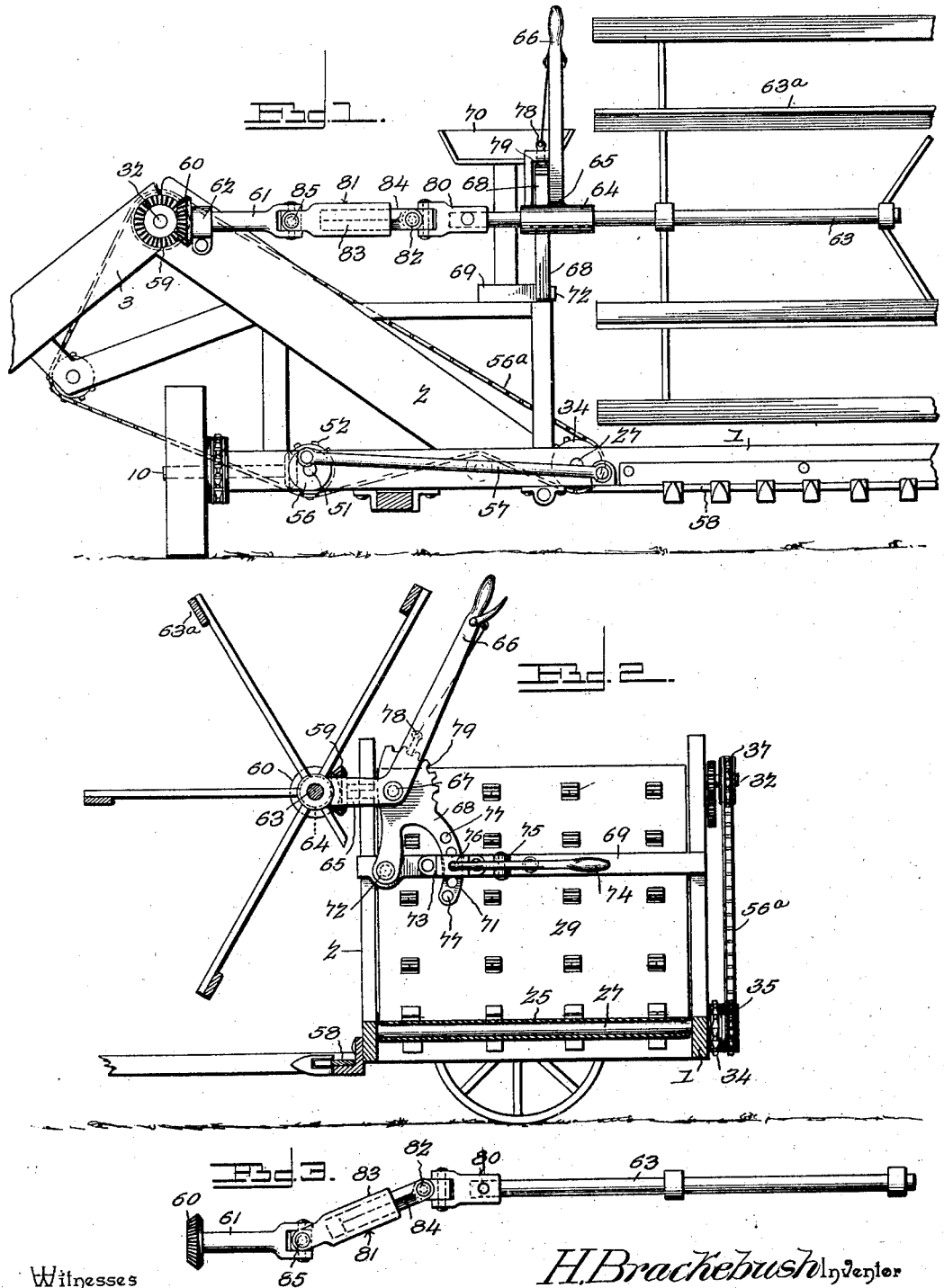

HENRY BRACKEBUSH, OF PACKWAUKEE, WISCONSIN.

REEL FOR HARVESTING-MACHINES.

SPECIFICATION forming part of Letters Patent No. 660,555, dated October 30, 1900.

Original application filed March 20, 1900, Serial No. 9,427. Divided and this application filed July 16, 1900. Serial No. 23,780. (No model.)

*To all whom it may concern:*

Be it known that I, HENRY BRACKEBUSH, a citizen of the United States, residing at Packwaukee, in the county of Marquette and State of Wisconsin, have invented a new and useful Reel for Harvesting-Machines, of which the following is a specification.

My invention is an improved reel for harvesting-machines for sweeping the cut grain from the cutting mechanism rearward onto the platform conveyer.

My present invention is a division of the application for Letters Patent of the United States, Serial No. 9,427, filed by me March 20, 1900.

One object of my invention is to provide an improved flexible connection between the reel and its counter-shaft to admit of the adjustment of the reel when the harvesting-machine is in operation.

A further object of my invention is to provide improved means for supporting the reel and whereby the reel may be readily adjusted.

My invention consists in the peculiar construction and combination of devices hereinafter fully set forth, and pointed out in the claims.

In the accompanying drawings, Figure 1 is a front elevation of a portion of a harvesting-machine provided with a reel constructed in accordance with my invention. Fig. 2 is a transverse sectional view of the same. Fig. 3 is a detail view of the reel-shaft and the flexible connection between said reel-shaft and the counter-shaft.

In the embodiment of my invention herein shown, 1 represents the platform-frame, 2 the inclined elevator-frame, and 3 the inclined frame which supports the grain-deck on which the grain is bound by a suitable mechanism. (Not here shown, as the same forms no part of my present improvements and is the subject-matter of a divisional application for Letters Patent of the United States which I am about to file.)

The shaft 10 of the traction-wheel at the inner end of the frame 1 is geared to a shaft 51 by suitable gearing, (indicated in dotted lines,) the said shaft 51 being provided at its rear end with a sprocket-wheel 52 and at its front end with a crank-wheel 56. The wrist of the latter is connected to the cutter-bar 58 by a pitman 57, which communicates motion to the cutter-bar, as will be understood. The platform conveyer 25 is operated by a shaft 27, which has at its rear end a sprocket-wheel 34. A counter-shaft 32, which conveys motion to the elevator-apron 29, is provided at its rear end with a sprocket-wheel 37 and at its front end with a miter gear-wheel 59. An endless sprocket-chain 56$^a$ connects the sprocket-wheels 27, 37, and 52 and communicates motion to the platform and elevating conveyers, to the cutting mechanism, as hereinbefore described, and also to the counter-shaft 32. The reel-shaft 63 is journaled at its inner end in a sleeve-bearing 64, which is carried at the front end of the short arm 65 of a bent lever 66, the latter being fulcrumed, as at 67, on a pivoted support or bracket 68, that is mounted on a transverse beam 69, which is supported on the lower portion of the elevator-frame and carries the seat 70 for the driver. Said pivoted supporting-bracket 68 is provided with a curved adjusting-arm 71, that is concentric with its pivot 72 and is guided in a keeper 73, secured on one side of beam 69. A lock-lever 74 is fulcrumed, as at 75, in supports which project from the same side of said beam 69, and said lock-lever has a detent 76 at its free front end which operates in an opening in the keeper 73 and is adapted to engage any of the series of adjusting-openings 77 with which the curved arm 71 of the pivoted supporting-bracket 68 is provided.

It follows from the above that by first disengaging the lock-lever 74 from the pivoted supporting-bracket 68 the latter may by means of the lever 66 be inclined forward or rearward, so as to move the reel forward or rearward to any required adjustment. The said lever 66 may be turned on its pivot after the supporting-bracket 68 has been secured, so as to raise or lower the reel, as may be required, and said lever has a spring-pressed detent 78, which engages a rack-segment 79, with which the pivoted supporting-bracket 68 is provided, and thereby said lever may be secured to said bracket when the reel has been fixed at any desired adjustment.

A short shaft 61, which is supported on the front side of the elevator-frame by a bearing-bracket 62, is provided at its outer end with a miter gear-wheel 60, which meshes with the miter gear-wheel 59 on the counter-shaft 32, and thereby said shaft 61 is rotated, as will be understood. To the inner end of the reel-shaft 63 is detachably secured a sleeve 80, to which is connected an extensible telescopic link 81 by means of a knuckle-joint 82. The said telescopic link 81 comprises the members 83 84, the latter of which is adapted to slide lengthwise in an angular longitudinal opening with which the former is provided, and said member 83 of said extensible link is connected to the inner end of the shaft 61 by means of a knuckle-joint 85. It will be understood from the foregoing and by reference to the drawings, more particularly to Fig. 3 thereof, that said link 81 and knuckle-joint 82 85 form a flexible connection between the reel-shaft and its operating or counter shaft 61, whereby said reel is adapted to be variously adjusted, as hereinbefore described, without affecting its operative relation to said counter-shaft 61.

Having thus described my invention, I claim—

1. In a harvester, the combination of an elevator, having a roller at its upper end, a shaft 61 in a bearing on the front side of the harvester and geared to said roller, a transverse beam 69 on the harvester-frame, a supporting-bracket pivoted to said beam, having a curved adjusting-arm on its rear lower side, and a rack-segment at its upper end, a locking device on said beam, to engage said adjusting-arm, a lever pivoted to said bracket, having a locking-dog to engage the rack-segment thereof, and provided further at its lower end, with a forward-extending arm, a reel having its shaft journaled in a bearing in said arm, and an extensible telescopic link and knuckle-joints connecting said reel-shaft to said shaft 61, substantially as described.

2. In a harvester, in combination with shaft 61 in a bearing on the front side thereof, and means to rotate said shaft, a supporting-bracket pivoted on the frame of the harvester, having a curved adjusting-arm on its rear side and a rack-segment at its upper end, a locking device for said adjusting-arm, a lever, pivoted to said bracket, having a locking-dog to engage the rack-segment thereof and provided further with a forward-extending arm, a reel having the shaft journaled in a bearing in said arm, and an extensible telescopic link and knuckle-joints connecting said reel-shaft to said shaft 61, substantially as described.

In testimony that I claim the foregoing as my own I have hereto affixed my signature in the presence of two witnesses.

HENRY BRACKEBUSH.

Witnesses:
F. J. DODGE,
ARTHUR J. BARRY.